United States Patent [19]

Mayr et al.

[11] Patent Number: 4,476,289

[45] Date of Patent: * Oct. 9, 1984

[54] CATALYSTS FOR THE POLYMERIZATION OF OLEFINS

[75] Inventors: Adolfo Mayr; Ermanno Susa, both of Ferrara; Ettore Giachetti, Milan, Italy

[73] Assignee: Montecatini Edison S.p.A., Milan, Italy

[*] Notice: The portion of the term of this patent subsequent to Nov. 3, 1998 has been disclaimed.

[21] Appl. No.: 269,604

[22] Filed: Jun. 2, 1981

Related U.S. Application Data

[63] Continuation of Ser. No. 622,550, Oct. 14, 1975, Pat. No. 4,298,718, which is a continuation of Ser. No. 324,596, Jan. 18, 1973, abandoned, which is a continuation of Ser. No. 878,954, Nov. 21, 1969, abandoned.

[30] Foreign Application Priority Data

Nov. 25, 1968 [IT] Italy ................................ 24141 A/68

[51] Int. Cl.³ .......................... C08F 4/02; C08F 10/00
[52] U.S. Cl. .................................... 526/125; 502/105; 502/134; 526/122; 526/352; 526/906
[58] Field of Search .................... 252/429 C; 526/125; 502/134

[56] References Cited

U.S. PATENT DOCUMENTS

| 2,981,725 | 4/1961 | Luft et al. | 526/125 |
| 3,008,943 | 11/1961 | Guyer | 526/129 |
| 3,047,551 | 7/1962 | Thomas | 526/156 |
| 3,153,634 | 10/1964 | Thomas | 526/156 |
| 3,238,146 | 3/1966 | Hewett et al. | 526/125 |
| 3,642,746 | 2/1972 | Kashiwa et al. | 526/125 |
| 3,644,318 | 2/1972 | Diedrich et al. | 526/124 |
| 4,298,718 | 11/1981 | Mayr et al. | 526/122 |

FOREIGN PATENT DOCUMENTS

| 222426 | 6/1959 | Australia . |
| 601919 | 7/1960 | Canada . |
| 6714024 | 4/1968 | Netherlands . |

Primary Examiner—Edward J. Smith

[57] ABSTRACT

Catalysts useful in the polymerization of olefins, more particularly of ethylene and mixtures thereof with higher alpha-olefins and/or diolefins, are disclosed. The new catalysts are obtained by mixing a hydride or organometallic compound of a metal belonging to Groups I to III of the Mendelyeev Periodic System with the product obtained by contacting a titanium tetrahalide with a support comprising an anhydrous magnesium or zinc halide in an active form, under particular conditions.

19 Claims, No Drawings 4,476,289

CATALYSTS FOR THE POLYMERIZATION OF OLEFINS

This is a continuation of application Ser. No. 622,550, filed Oct. 14, 1975, now U.S. Pat. No. 4,298,718, which in turn is a continuation of application Ser. No. 324,596, filed Jan. 18, 1973, now abandoned, which in turn is a continuation of application Ser. No. 878,954, filed Nov. 21, 1969, now abandoned.

THE PRIOR ART

British Pat. No. 904,510 discloses catalysts for the polymerization of olefins which consist of the product of reaction between organometallic compounds of metals belonging to Groups I to III inclusive of the Mendelyeev Periodic System with an inorganic salt of the $MgCl_2$ type coated on the surface with a molecularly thin layer of a transition metal halide.

The amount of transition metal halide deposited on the inorganic support does not exceed 1% by weight of the support.

According to the British patent, the transition metal compound cannot be used in amounts greater than 1% without considerably reducing the activity of the catalyst. This results from the fact that the inorganic salts used in the British patent are never subjected to any treatment for converting them to active forms suitable for obtaining catalysts which are highly active even in the presence of very large amounts of the supported transition metal compound. Because of the low amount of the catalytically active transition metal compound present on the supports, and as disclosed in the British patent, it is necessary to use very large amounts of the supported catalysts in order to obtain polymer yields of practical interest. The use of such large amounts of the supported catalyst entails the necessity of purifying the polymer from catalyst residues at the end of the polymerization.

THE PRESENT INVENTION

One object of this invention is to provide new supported polymerization catalysts in which the support is in active form and which are highly active in the polymerization of olefins even when relatively large amounts of a transition metal compound are carried by the support, and the use of which makes it possible, in many cases, to avoid the need to subject the polymer to a special purification at the end of the polymerization.

This and other objects are accomplished by the invention in accordance with which new polymerization catalysts are prepared by activating, with a hydride or organometallic compound of a metal belonging to one of the Groups I to III of the Mendelyeev Periodic System, the product obtained by contacting a titanium tetrahalide with a support comprising an anhydrous magnesium or zinc halide under conditions such that the magnesium or zinc halide is converted to an active form, or by contacting the titanium tetrahalide with a pre-activated anhydrous magnesium or zinc halide.

As the active anhydrous magnesium or zinc halide, we intend such a halide having one or both of the following properties:

(1) An X-ray powder spectrum in which the most intense diffraction line present in the powder spectrum of the normal, non-activated Mg or Zn halide is less intense and, in its place, a more or less broadened halo appears;

(2) The surface area of the active magnesium or zinc halide is greater than 3 $m^2/g$, and preferably 10 $m^2/g$.

It has been noted that the very active forms of the Mg and Zn halides are characterized in that the powder spectra thereof show a broadening of the diffraction line which, in the powder spectrum of the unactivated forms of the Mg and Zn halides, has the highest intensity and/or in that those halides have a surface area greater than 15 $m^2/g$.

For example, in the case of anhydrous $MgCl_2$, the X-ray powder spectrum of many of the active forms is characterized in that the diffraction line appearing at a lattice distance (d) of 2.56 Å, and which is the most intense diffraction line in the powder spectrum of the unactivated MgCl, is less intense in the powder spectrum of the active $MgCl_2$ while, in its place, there appears, in the latter powder spectrum, a broadened halo which is comprised in the range d=2.56 Å to 2.95 Å.

Also, the X-ray powder spectra of many of the active forms of $MgBr_2$ are characterized in that the diffraction line at d=2.93 Å, which is the most intense diffraction line in the powder spectra of the unactivated $MgBr_2$ is less intense and in its place there appears a broadened halo comprised within d=2.80 Å and 3.25 Å.

The supported catalysts of this invention can be prepared by many methods.

One method consists of contacting, at a given temperature including room temperature, a pre-activated anhydrous Mg or Zn halide with the titanium tetrahalide, for a time sufficient for fixing at least part of the titanium compound on the support. Preferably, the Ti tetrhalide is added to a suspension of the activated anhydrous Mg or Zn halide in an inert solvent which is evaporated at the end of the treatment. The amount of titanium tetrahalide used in this embodiment is preferably comprised between 0.1% and 5% by weight with respect to the Mg or Zn halides.

It is also possible, and this is the preferred method, to prepare the supported catalytic component by grinding the anhydrous Mg or Zn halide in the presence of the titanium tetrahalide, preferably used in an amount lower than 10% by weight with respect to the support.

It has also been found possible to obtain the supported catalytic component by heating the non-active anhydrous Mg or Zn halide with an excess (with respect to the anhydrous Mg or Zn halide) of the titanium tetrahalide, more particularly $TiCl_4$, at relatively high temperatures, in general higher than about 70°–80° C., and then cooling the mixture and separating the Mg or Zn halide from it. When $TiCl_4$ is used, the operation is preferably performed at the boiling point of the tetrachloride.

Pre-activated Mg or Zn halide can be carried out in various ways. One method consists in subjecting the anhydrous Mg or Zn halide to mechanical treatment, such as grinding, for a time and under conditions such that the Mg or Zn halide is converted to an active form having the properties set forth hereinabove.

The grinding is preferably performed in a ball mill, in the absence of inert solvents, for a time depending on the effectiveness of the grinding apparatus. For example, a grinding time of about one hour is effective when the support is ground in a centrifugal mill loaded with porcelain balls. Shorter times may be sufficient when particularly efficient mills are used. such as vibrating ball mills.

These grinding conditions suitable for activating the Mg or Zn halide in the absence of titanium tetrahalide are also useful when the Mg or Zn halides are activated in admixture with the titanium tetrahalide.

According to another embodiment of this invention, very active forms of Mg and Zn halides are obtained by decomposing, according to known methods, organometallic compounds of the formulae RMgX or RZnX in which R is a hydrocarbon radical, for instance an alkyl or aryl radical, and X is halogen. Or the organometallic compounds can be converted to the active Mg and Zn halides by treatment with the stoichiometric, or greater than stoichiometric, amount of a halogenated compound such as, for example, anhydrous gaseous hydrogen chloride.

Another useful method for obtaining the active Mg and Zn halides consists in dissolving the normal halides in an organic solvent, such as, for example, alcohol, ether, or an amine, quickly evaporating the solvent, and then completing the solvent removal by heating the halide under reduced pressure at temperatures above 100° C., and generally comprised between 100° C. and 400° C. Anhydrous $MgCl_2$ has been obtained in active form from solutions thereof in $CH_3OH$, by this method.

The catalytic components of this invention comprising the titanium compound and active support contain the Ti compound (which may be present as an active compound bound to the support or, in a given case, in the form of a separable physical phase in amounts which can vary from very low values, such as, for instance, 0.01% by weight, with respect to the support, to higher values, such as 20% or higher. Preferably, the amount of the Ti compound is comprised between 0.1% and 5% by weight, with respect to the Mg or Zn halide.

Summing up, the catalysts of this invention are formed by mixing
  (a) the product obtained by contacting a titanium tetrahalide, preferably $TiCl_4$, with an anhydrous Mg or Zn halide, under conditions such that the Mg or Zn halide is converted to an form having the properties specified herein, or by contacting the titanium tetrahalide with a pre-activated anhydrous Mg or Zn halide, with
  (b) a hydride or organometallic compound of metals belonging to Groups I to III of the Mendelyeev Periodic System.

Preferably, the organometallic compound or hydride (b) is selected from the following group of compounds: aluminum, triethyl, diethyl aluminum chloride, aluminum triisobutyl, diisobutyl aluminum chloride, ethyl aluminim sesquichloride, diethyl aluminum hydride, diisobutyl aluminum hydride, diethyl aluminum bromide, lithium aluminum tetraisobutyl, lithium butyl, and magnesium diethyl.

The molar ratio between the organometallic compound or hydride and the titanium tetrahalide is not critical. For polymerizing ethylene, the molar ratio Al/Ti is preferably comprised between 50 and 1000.

While the catalysts of this invention are particularly useful in polymerizing ethylene and its mixtures with higher alpha-olefins such as propylene, butene-1, etc., particularly in regard to the yield of polymer obtained.

The polymerization with the present catalysts is carried out in the conventional manner, in a liquid phase in the presence or absence of inert solvents, or in the gaseous phase.

The polymerization temperature may be comprised between $-80°$ C. and $+200°$ C., preferably between 50° C. and 100° C., at atmospheric or increased pressure.

The molecular weight of the polymer formed may be regulated according to known expedients, as by including in the polymerization zone an alkyl halide, organometallic compounds of cadmium and zinc, or hydrogen.

The catalytic activity of the catalysts of this invention is little influenced by the presence of the molecular weight regulators.

For instance, when polymerizing ethylene, it is possible to regulate the molecular weight of the polyethylene in a range of practically useful intrinsic viscosities, determined in tetralin at 135° C., comprised between about 1.5 and 3.0 dl/g, without a decrease in the polymer yield to a value below which it would become necessary to purify the polymer of catalyst residues, at the end of the polymerization reaction.

The polyethylene obtained is a substantially linear, highly crystalline polymer having a density equal to or greater than 0.96 g/cc. It is easily processed, particularly in injection molding, and, in general, is more easily processed than polyethylene obtained with the aid of conventional so-called "Ziegler" catalyts. The Ti content of the polyethylene is generally lower than 20 ppm by weight, without need for purification treatments.

The following examples are given to illustrate the invention, and are not intended to be limiting.

Unless specified, the percentages given in the examples are in percent by weight.

EXAMPLE 1

Into a centrifugal mill of 330 cc holding capacity, loaded with four porcelain balls, two with a diameter of 31.9 mm and two with a diameter of 40.9 mm, were introduced 48 g of anhydrous $MgCl_2$ having a surface area of 1 $m^2/g$ together with 8 g of $TiCl_4$. The mixture was ground for two hours.

The analysis of the ground product gave the following results: Ti=2.7%; Cl=72%. Its surface area was 20 $m^2/g$. 0.06 of this ground product was then used to polymerize ethylene under the following conditions: Into a stainless steel autoclave having a holding capacity of 1.8 liters, and purified with nitrogen, there were introduced 1000 cc of technical heptane and then 2 g of $Al(iC_4H_9)_3$. Thereupon the temperature was brought up to 75° C. and 0.06 g of the ground product suspended in 50 cc of n-heptane added. Immediately thereafter there were introduced 3 atm. of hydrogen and 10 atm. of ethylene. The temperature rose to 85° C. The pressure was then maintained constant at this value by continuously feeding ethylene. After two hours, the suspension was discharged from the autoclave. The polymer was separated by filtration and dried under vacuum at 100° C.

Thereby were obtained 195 g of polyethylene having an intrinsic viscosity, in tetraline, at 135° C., of 2.5 dl/g. The yield in polymer was 121,000 g/g of Ti.

EXAMPLE 2

7.3 g of anhydrous $MgCl_2$ of the type used in the preceding example were ground for one hour in the ball mill of Example 1, with 0.5178 of $TiCl_4$.

The content in Ti of the ground product was 1.4%. The surface area of the product was 15 $m^2/g$. 0.0490 g of the ground product was used to polymerize ethylene under the conditions of Example 1, i.e., using Al-$(iC_4H_9)_3$ to activate the supported Ti compound. After four hours, there were obtained 395 g of a polymer having an intrinsic viscosity, in tetralin at 135° C., of 2.5. dl/g. The yield in polymer was 570,000 g/g of Ti.

EXAMPLE 3

25 g of anhyrous $MgCl_2$ of the type used in the preceding examples were ground for 3 hours in a ball mill of the type used in said examples. The surface area of the ground product was 22 $m^2/g$. 10 g of this ground product, 50 cc of n-heptane and 0.590 g of $TiCl_4$ were introduced into a 250 cc flask fitted with a stirrer. This suspension was stirred for one hour at room temperature, after which the solvent was evaporated.

The thus obtained solid product had a titanium content of 1%. 0.133 g of this product was then used in the polymerization of ethylene, the polymerization being conducted under the same conditions as those of Example 1. After four hours, there were obtained 400 g of polymer with an intrinsic viscosity, in tetralin at 135° C., of 2.1 dl/g. The polymer yield was 300,000 g/g of Ti.

EXAMPLE 4

9.25 g or ground $MgCl_2$ as in the preceding example, 0.14 g of $TiCl_4$ and 50 cc of n-heptane were treated under the same conditions as those of the said example. The solid product thus obtained showed, on analysis, a Ti content of 0.36%. 0.734 g of this product was then used in the polymerization of ethylene, under the conditions specified in the preceding examples. After 4 hours, there were obtained 151 g of polymer with an intrinsic viscosity, in tetralin at 135° C., of 2.9 dl/g. The polymer yield was 590,000 g/g Ti.

EXAMPLE 5

10 mg of $MgCl_2$, ground under the same conditions as those of Example 3, 0.59 g of $TiCl_4$ and 75 cc of n-heptane were treated under the same conditions as those of Example 3. The solid product thus obtained contained 0.88% of Ti.

0.0746 g of said product was then used in the polymerization of ethylene, under the same conditions as those used in the preceding examples. After four hours, there were obtained 182 g of polymer with an intrinsic viscosity, in tetralin at 135° C., of 2.4 dl/g. The polymer yield was 277,000 g/g of Ti.

EXAMPLE 6

The product obtained from $TiCl_4$ and anhydrous $MgCl_2$ by operating under the same conditions as those of the preceding example, and from which the solvent had been removed by evaporation, was washed with n-heptane until chlorine ions were no longer detected in the washing liquid. The washed product has a Ti content of 0.16% 0.4029 g of said product was then used in the polymerization of ethylene under the same conditions as those of the preceding examples. After four hours of polymerization, there was obtained 279 g of polymer. The polymer yield was 435,000 g/g of Ti.

EXAMPLE 7

15.2 g of an anhydrous $MgCl_2$ having a mean particle size comprised between 125 and 177 microns and a surface area of 1 $m^2/g$, 0.64 g of $TiCl_4$, and 75 cc of n-heptane were treated under the same conditions as those of Example 3. The analysis of the product, after evaporation of the solvent should give a Ti content of 0.25%. 0.1053 g of said product was used in the polymerization of ethylene under the same conditions as those of the preceding examples. After four hours of polymerization, there were obtained 17.6 g of polymer in a yield of 67,000 g/g of Ti.

EXAMPLE 8

The product obtained from $TiCl_4$ and anhydrous $MgCl_2$, under the conditions described in example 7, and from which the solvent had been removed by evaporation, was repeatedly washed with n-heptane until chlorine ions could no longer be detected in the washing liquid. The washed product had a Ti content of 0.09%. 0.751 g of said product was then used in the polymerization of ethylene under the same conditions as described in the preceding examples. After four hours of polymerization there were obtained 34 g of polymer in a yield of 50,000 g/g of Ti.

EXAMPLE 9

29 g of an anhydrous $MgCl_2$ having a surface area of 0.5 $m^2/g$ were introduced into an autoclave provided with a stirrer and fitted with a filtering plate on its bottom, and containing 300 cc of $TiCl_4$ heated to 135° C. After one hour of heating the excess $TiCl_4$ was removed by filtering. The solid product left behind in the autoclave was repeatedly washed with cyclohexane until the total disappearance of the $TiCl_4$. The analysis of the solid product thus obtained showed a Ti content of 0.18% and a Cl content of 73.1%.

0.57 g of said solid product was then used in the polymerization of ethylene under the same conditions as those of the preceding examples. After four hours of polymerization, there were obtained 401 g of polymer having an intrinsic viscosity, in tetralin at 135° C., of 2.8 dl/g. The polymer yield was 400,000 g/g of Ti.

EXAMPLE 10

Example 9 was repeated with the difference that the $MgCl_2$ used was one which had been preactivated by grinding thereof for 2.5 hours in a ball mill of the type used in the preceding examples. After treatment with $TiCl_4$, the analysis of the washed product showed the presence of 0.66% of Ti and 73.8% of Cl.

0.170 g of this product was then used in the polymerization of ethylene under the same conditions as those of the preceding examples. After four hours of polymerization, there were obtained 448 g of polymer in a yield of 400,000 g/g of Ti.

EXAMPLE 11

Example 9 was repeated, with the difference that there were used 22 g of $MgCl_2$ not activated by grinding, and having a mean particle size comprised between 125 and 177, a surface area of 1 $m^2/g$. After having been treated with $TiCl_4$, the washed and dried product showed the presence of 0.3% of Ti and 72.8% of Cl. 0.31 g of the washed product was then used in the polymerization of ethylene under the same conditions described in the preceding examples. After four hours of polymerization, there were obtained 271 g of polymer in a yield of 291,000 g/g of Ti.

EXAMPLE 12

35 g of the magnesium chloride used in the preceding example were suspended in 130 cc of $TiCl_4$. The suspension was then kept under stirring at room temperature for 24 hours, after which the excess $TiCl_4$ was removed by filtering. The solid product obtained was then repeatedly washed with cyclohexane until complete disappearance of $TiCl_4$ from the washing liquid. The analysis of the washed and dried product showed a Ti content of 0.66%.

0.31 g of the product thus obtained was used in the polymerization of ethylene under the same conditions as those of the preceding examples. After two hours of polymerization, no polymer had formed.

EXAMPLE 13

7.1 g of $MgBr_2$ were ground for three hours in the ball mill of Example 1, in the presence of 0.5120 g of $TiCl_4$. The Ti content of the ground product was 1.3%. Its surface area was 27 $m^2/g$. 0.051 g of said product was used in the polymerization of ethylene according to the conditions of the preceding examples. After four hours, there were obtained 330 g of a polymer having an intrinsic viscosity of 2.3 dl/g, determined in tetralin at 135° C. The polymer yield was 500,000 g/g Ti.

EXAMPLE 14

The $MgCl_2$ used in this example was obtained by reaction of $C_2H_5MgCl$ in solution in ether with anhydrous gaseous HCl which has bubbled through the solution until precipitation of $MgCl_2$ which was then filtered and dried at 200° C. under vacuum. The surface area of the product was 142 $m^2/g$ and its x-ray powder spectrum showed a marked broadening of the diffraction line at $d=2.56$ Å.

9.25 g of said product, 0.14 of $TiBr_4$ and 50 cc of n-heptane were introduced into a 250 cc flask fitted with a stirrer. The suspension was stirred for one hour at room temperature, after which the solvent was evaporated.

0.073 g of the product thus obtained was then used in the polymerization of ethylene under the same conditions as those used in the preceding examples. After four hours, 150 g of polyethlyene having an intrinsic viscosity of 2.3 dl/g were obtained.

EXAMPLE 15

The $MgCl_2$ used in this example was obtained by rapidly evaporating the solvent from a solution of 15 g of $MgCl_2$ having a surface area of 1 $m^2/g$ in $CH_3OH$, and then completing removal of the alcohol by heating the product at 300° C. under vacuum. The so obtained $MgCl_2$ had a surface area of 32 $m^2/g$; its X-ray spectrum showed a marked broadening of the diffraction line which appears at $d=2.56$ Å in the spectrum of $MgCl_2$ of the normal type.

9.25 g of said product, 0.14 g $TiCl_4$ and 50 cc of n-heptane were introduced into a 250 cc flask fitted with a stirrer. The suspension was stirred for one hour at room temperature, after which the solvent was evaporated.

0.05 g of the resulting product was used in the polymerization of ethylene under the same conditions used in the preceding examples, to obtain 150 g of polyethlyene having an intrinsic viscosity of 2.1 dl/g.

As will be apparent, changes in details maybe made in practicing this invention, without departing from its spirit. Therefore, we intend to include in the scope of the appended claims all such modifications as will be obvious to those skilled in the art from the description and working examples given herein.

We claim:

1. A supported catalyst-forming component for use in preparing catalysts for the polymerization of olefins and comprising the product obtained by contacting a titanium tetrahalide with an anhydrous magnesium dihalide in an active form characterized in that, in its X-ray powder spectrum, the diffraction line which is most intense in the spectrum of the normal, non-active magnesium dihalide is less intense and, in its place, a halo appears.

2. A catalyst-forming component according to claim 1, in which the titanium tetrahalide is $TiCl_4$.

3. A catalyst-forming component according to claim 1, in which the magnesium dihalide is $MgCl_2$.

4. A catalyst-forming component according to claim 1, in which the magnesium dihalide is $MgBr_2$.

5. A catalyst-forming component according to claim 1, in which the titanium tetrahalide is $TiCl_4$ and the magnesium dihalide is $MgCl_2$.

6. A catalyst-forming component according to claim 1, in which the titanium tetrahalide is $TiCl_4$ and the magnesium dihalide is $MgBr_2$.

7. A supported catalyst-forming component for use in preparing catalysts for the polymerization of olefins, and comprising the product obtained by cogrinding a titanium tetrahalide with an active form of a Mg diahlide selected from the group consisting of $MgCl_2$ and $MgBr_2$ said active forms being characterized in that in the X-rays powder spectrum of the active $MgCl_2$ a halo appears in a range of lattice distances (d) comprised from $d=2.56$ Å to $d=2.95$ Å, and in that in the X-rays powder spectrum of the active $MgBr_2$ a halo appears in a range of lattice distances (d) comprised from $d=280$ Å to $d=3.25$ Å.

8. A catalyst-forming component according to claim 7, and the active Mg dihalide of which is $MgCl_2$.

9. A catalyst-forming component according to claim 7, and the active Mg dihalide of which is $MgBr_2$.

10. A catalyst useful for polymerizing olefins and prepared by mixing
    (a) a supported catalyst-forming component comprising the product obtained by contacting a titanium tetrahalide with an anhydrous magnesium dihalide in an active form characterized in that, in its X-rays powder spectrum, the diffraction line which is most intense in the spectrum of the normal, non-active magnesium dihalide is less intense and, in its place, a halo appears; with
    (b) a catalyst-forming component which is a hydride or organometallic compound of a metal belonging to Groups I to III of the Mendelyeev Periodic Table.

11. A catalyst according to claim 10, in which the titanium tetrahalide is $TiCl_4$.

12. A catalyst according to claim 10, in which the magnesium dihalide is $MgCl_2$.

13. A catalyst according to claim 10, in which the magnesium dihalide is $MgBr_2$.

14. A catalyst according to claim 10, in which the titanium tetrahalide is $TiCl_4$ and the magnesium dihalide is $MgCl_2$.

15. A catalyst according to claim 10, in which the titanium tetrahalide is $TiCl_4$ and the magnesium dihalide is $MgBr_2$.

16. A catalyst according to claim 10, in which component (b) is an alkyl aluminum compound.

17. A catalyst according to claim 10, in which the titanium tetrahalide is $TiCl_4$, the magnesium dihalide is $MgCl_2$, and the component (b) is an alkyl aluminum compound.

18. A catalyst according to claim 10, in which the titanium tetrahalide is $TiCl_4$, the magnesium dihalide is $MgBr_2$, and component (b) is an alkyl aluminum compound.

19. A process for the polymerization of olefins, characterized in that the polymerization is carried out in the presence of a catalyst as defined in claim 10, or 11, or 12, or 13, or 14, or 15, or 16, or 17, or 18.

* * * * *